US012784656B2

(12) United States Patent
Luo et al.

(10) Patent No.: US 12,784,656 B2
(45) Date of Patent: Nov. 3, 2026

(54) PROCESSING CIRCUIT, PROCESSING METHOD, DISPLAY APPARATUS, AND ELECTRONIC DEVICE

(71) Applicant: Huawei Technologies Co., Ltd., Shenzhen (CN)

(72) Inventors: Kun Luo, Shenzhen (CN); Congbiao Jiang, Shenzhen (CN); Shipeng Chi, Shenzhen (CN); Pengfei Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/999,480

(22) Filed: Dec. 23, 2024

(65) Prior Publication Data

US 2025/0124859 A1 Apr. 17, 2025

Related U.S. Application Data

(63) Continuation of application No. PCT/CN2023/099500, filed on Jun. 9, 2023.

(30) Foreign Application Priority Data

Jun. 23, 2022 (CN) ........................ 202210719420.X
Oct. 19, 2022 (CN) ........................ 202211282499.0

(51) Int. Cl.
*G09G 3/00* (2006.01)
*G09G 3/32* (2016.01)

(52) U.S. Cl.
CPC ............... *G09G 3/32* (2013.01); *G09G 3/006* (2013.01); *G09G 2300/0413* (2013.01); *G09G 2310/08* (2013.01); *G09G 2320/0223* (2013.01); *G09G 2330/021* (2013.01)

(58) Field of Classification Search
CPC .. G09G 3/32; G09G 3/006; G09G 2300/0413; G09G 2310/08; G09G 2320/0223; G09G 2330/021
See application file for complete search history.

(56) References Cited

U.S. PATENT DOCUMENTS

2001/0043168 A1 11/2001 Koyama et al.
2008/0150845 A1 6/2008 Ishii et al.
2021/0201784 A1* 7/2021 Kim ..................... G09G 3/2003
2022/0044641 A1 2/2022 Park et al.

FOREIGN PATENT DOCUMENTS

CN 105405425 A 3/2016
CN 109215595 A 1/2019

* cited by examiner

*Primary Examiner* — Dennis P Joseph
(74) *Attorney, Agent, or Firm* — Conley Rose, P.C.

(57) ABSTRACT

A processing circuit includes a load unit and a detection circuit, and a proportional relationship exists between a load value of the load unit and a load value of a first pixel line. The load value of the load unit is obtained through the detection circuit, to obtain the load value of the first pixel line. Then, based on the load value of the first pixel line, a drive current circuit is controlled to provide a corresponding drive current to the first pixel line. When the drive current enables a light-emitting diode (LED) on the first pixel line to emit light within drive time, a current value is as small as possible.

20 Claims, 10 Drawing Sheets

PROCESSING CIRCUIT, PROCESSING METHOD, DISPLAY APPARATUS, AND ELECTRONIC DEVICE

CROSS-REFERENCE TO RELATED APPLICATION

This is a continuation of International Patent Application No. PCT/CN2023/099500 filed on Jun. 9, 2023, which claims priority to Chinese Patent Application No. 202210719420.X filed on Jun. 23, 2022 and Chinese Patent Application No. 202211282499.0 filed on Oct. 19, 2022. All of the aforementioned patent applications are hereby incorporated by reference in their entireties.

TECHNICAL FIELD

This disclosure relates to the field of light-emitting diode (LED) driving technologies, and in particular, to a processing circuit, a processing method, a display apparatus, and an electronic device.

BACKGROUND

An LED display apparatus includes a plurality of pixel lines, a drive circuit, and a data circuit, and each pixel line is coupled to a plurality of LEDs. The drive circuit provides a drive current for one pixel line at a time, and the data circuit receives a digital signal, and controls, based on the digital signal, an LED corresponding to a single pixel line to emit light. The drive circuit provides drive currents for different pixel lines through fast refreshing, so that the display apparatus displays an image. However, due to a deviation of a chip manufacturing process, widths of pixel lines between different display apparatuses of a same model also have a deviation. Consequently, resistance loads and capacitance loads of the pixel lines between the different display apparatuses are different.

When the LED emits the light via the drive current, because the pixel line also has a resistance load and a capacitance load, the pixel line is also charged. This increases time required for the LED to emit the light via the drive current. If the resistance load and the capacitance load on the pixel line are excessively large, drive time required for the LED on the pixel line to normally emit the light exceeds specified drive time. Consequently, a display exception occurs. Because a load on the pixel line cannot be directly detected, a value of the drive current cannot be adjusted based on a value of the load. To ensure that the drive time is less than the specified drive time, for each of all display apparatuses of a same model, a drive current provided by a drive circuit is set to a maximum value, to ensure that all the display apparatuses of the same model can perform display normally. However, this increases power consumption of the display apparatus.

SUMMARY

Embodiments of this disclosure provide a processing circuit, a processing method, a display apparatus, and an electronic device, to detect a load on a pixel line.

To achieve the foregoing objectives, the following technical solutions are used in embodiments of this disclosure.

According to a first aspect, a processing circuit is provided, and is configured to provide a drive current for a first pixel line of a display unit. The processing circuit includes a detection circuit and a load unit. The detection circuit is coupled to the load unit, the detection circuit is configured to detect a load value of the load unit, and there is a proportional relationship between the load value of the load unit and a load value of the first pixel line. A drive current circuit is configured to provide the drive current for the first pixel line, and adjust a current value of the drive current based on the load value of the load unit.

In embodiments of this disclosure, the load unit is disposed, and there is the proportional relationship between the load value of the load unit and the load value of the first pixel line. The load value of the first pixel line may be obtained by detecting the load value of the load unit, thereby resolving a problem that the load value of the first pixel line is unmeasurable.

In some possible implementations, the processing circuit further includes a controller and the drive current circuit, and the controller is separately coupled to the drive current circuit and the detection circuit. The drive current circuit is coupled to the first pixel line of the display unit, and the drive current circuit is configured to provide the drive current to the first pixel line. The controller is configured to obtain the load value of the first pixel line based on the load value of the load unit, and control, based on the load value of the first pixel line, the current value of the drive current provided by the drive current circuit for the first pixel line.

In embodiments of this disclosure, the controller and the drive current circuit are further disposed in the processing circuit. The drive current circuit is configured to provide the drive current for the first pixel line. The controller adjusts, based on the load value of the first pixel line, the current value of the drive current provided by the drive current circuit, to reduce the current value of the drive current as much as possible when drive time of an LED on the first pixel line is less than specified drive time, so as to reduce power consumption.

In some possible implementations, the load unit is a second pixel line, and there is a proportional relationship between a width of the second pixel line and a width of the first pixel line. The controller is further configured to control the detection circuit to output a first pulse signal to a first end of the second pixel line, input a second pulse signal output by a second end of the second pixel line, and output a first feedback signal to the controller based on the second pulse signal, where the first feedback signal indicates a product of a resistance load and a capacitance load on the second pixel line, and obtain the load value of the second pixel line based on the first feedback signal and the proportional relationship between the width of the second pixel line and the width of the first pixel line.

In embodiments of this disclosure, the load unit is disposed, and there is the proportional relationship between the load value of the load unit and the load value of the first pixel line. The load value of the first pixel line may be obtained by detecting the load value of the load unit, and then the drive current corresponding to the current value is provided for the first pixel line based on the obtained load value of the first pixel line. The drive current corresponding to the current value is a current as small as possible when the LED on the first pixel line emits light within the specified drive time. In embodiments of this disclosure, a corresponding detection circuit is disposed in each processing circuit, a load value of a load unit is detected through the detection circuit, to obtain a load value of a first pixel line in a display unit, and a value of a drive current provided for the first pixel line is determined based on the load value of the first pixel line. In this way, it can be ensured that the drive current enables the LED on the first pixel line to emit light within specified drive time, and the drive current is as small as possible, to reduce power consumption of the display unit.

In some possible implementations, the second pixel line includes two dummy pixel lines, a width of the dummy pixel line is equal to the width of the first pixel line, second ends of the two dummy pixel lines are coupled, and first ends of the two dummy pixel lines serve as the first end of the second pixel line and the second end of the second pixel line.

In embodiments of this disclosure, when the first pixel line is generally manufactured by using a semiconductor process, the dummy pixel line is usually manufactured on the display unit. The dummy pixel line and the first pixel line are manufactured based on a same specification, but the dummy pixel line does not participate in actual light emitting. Therefore, for the display unit having the dummy pixel line, in actual application, the dummy pixel line is usually disposed at an edge position of the display unit, and may be used to assist in testing, or may be used to make the first pixel line not located at an edge of the display unit when the first pixel line is manufactured by using the semiconductor process, or the like. In embodiments of this disclosure, the dummy pixel line may be directly used as the second pixel line for detection, and no new pixel line needs to be additionally manufactured as the second pixel line. For example, two adjacent dummy pixel lines may be used, second ends of the two dummy pixel lines are short-circuited together through a short-circuit cable, and first ends of the two dummy pixel lines are used as the first end and the second end of the second pixel line and are configured to be coupled to the detection circuit. In this case, the width of the second pixel line is consistent with that of the first pixel line, and a length of the second pixel line is twice a length of the first pixel line.

In some possible implementations, the detection circuit is configured to obtain the first feedback signal based on high level duration of the second pulse signal.

In embodiments of this disclosure, the load unit may be a second pixel line. When the first pixel line is manufactured, the second pixel line is also manufactured on the display unit. The first pixel line is used for display, and the second pixel line does not participate in display work. A closed loop is formed on the second pixel line through the detection circuit. The controller outputs a first control signal to the detection circuit, where the first control signal indicates the detection circuit to detect the load value of the second pixel line. After the first control signal is input, the detection circuit starts to perform detection, which includes outputting the first pulse signal to the first end of the second pixel line. The first pulse signal is a pulse signal whose effective pulse width is fixed to A. After the first pulse signal is input to the first end of the second pixel line, because an LED on the second pixel line does not participate in working, the resistance load and the capacitance load on the second pixel line consume the first pulse signal, to obtain the second pulse signal output from the second end of the second pixel line. The second pulse signal is a pulse signal obtained after the first pulse signal is consumed by a load on the second pixel line, an effective pulse width of the second pulse signal is B, and the effective pulse width B is shorter than the effective pulse width A. After inputting the second pulse signal output by the second end of the second pixel line, the detection circuit may accumulate high levels of the second pulse signal based on the effective pulse width of the second pulse signal to obtain an accumulated voltage. A value of the accumulated voltage indicates an added value of all effective pulse widths (that is, high level duration) in the second effective pulse signal. The effective pulse width of the first pulse signal is fixed and known. A time constant of a resistive-capacitive (RC) load on the second pixel line may be obtained through calculation based on the effective pulse width of the first pulse signal and the effective pulse width of the second pulse signal, that is, the product of the resistance load and the capacitance load on the second pixel line. A value of a resistive-capacitive load on the first pixel line is obtained based on a value of the resistive-capacitive load on the second pixel line.

In some possible implementations, the load unit is a metal wire, and there is a proportional relationship between a width of the metal wire and a width of the first pixel line. The detection circuit includes a resistance detection circuit and a capacitance detection circuit, and the controller is separately coupled to the resistance detection circuit and the capacitance detection circuit. The resistance detection circuit is coupled to the metal wire, and the capacitance detection circuit is coupled to the first pixel line. The controller is further configured to control the resistance detection circuit to output a first voltage to a first end of the metal wire, input a second voltage output by a second end of the metal wire, and output a second feedback signal to the controller, where the second feedback signal indicates a resistance load on the metal wire, control the capacitance detection circuit to output a third pulse signal to a first end of the first pixel line, obtain a third voltage at a second end of the first pixel line, and output a third feedback signal to the controller, where the third feedback signal indicates a capacitance load on the first pixel line, obtain a resistance load on the first pixel line based on the second feedback signal and the proportional relationship between the width of the metal wire and the width of the first pixel line, and obtain the capacitance load on the first pixel line based on the third feedback signal.

In embodiments of this disclosure, the load unit may be a metal wire that is not coupled to the LED, and there is the proportional relationship between the width of the metal wire and the width of the first pixel line. The controller sends a second control signal to the resistance detection circuit, where the second control signal indicates the resistance detection circuit to detect the resistance load on the metal wire. A specific detection manner is as follows. The resistance detection circuit outputs the first voltage with a fixed voltage value to the first end of the metal wire, and inputs, from the second end of the metal wire, the second voltage output by the metal wire, where the second voltage is a voltage obtained after the first voltage input to the metal wire is consumed by the resistance load on the metal wire. A value of the resistance load on the metal wire may be obtained based on a voltage difference between the second voltage and the first voltage, and a value of the resistance load on the first pixel line may be obtained based on the value of the resistance load on the metal wire. The controller further sends a third control signal to the capacitance detection circuit, where the third control signal indicates the capacitance detection circuit to send the third pulse signal to the first end of the first pixel line, and the capacitance detection circuit obtains a voltage value (that is, a value of the third voltage) at the second end of the first pixel line. In this process, the LED on the first pixel line does not work. Therefore, the third pulse signal charges a parasitic capacitance of the first pixel line. The voltage value at the second end of the first pixel line increases with charging of the parasitic capacitance. After the parasitic capacitance is charged to a maximum value, the voltage value at the second end of the first pixel line reaches the maximum value and is fixed, that is, the third voltage reaches the maximum value.

In this case, the maximum value of the third voltage may indicate a value of the capacitance load on the first pixel line.

In some possible implementations, the processing circuit further includes a data selection switch, the drive current circuit is coupled to a first input end of the data selection switch, the capacitance detection circuit is coupled to a second input end of the data selection switch, and an output end of the data selection switch is coupled to the first end of the first pixel line. The controller is further configured to control conduction between the first input end of the data selection switch and the output end of the data selection switch, or control conduction between the second input end of the data selection switch and the output end of the data selection switch.

In embodiments of this disclosure, when the display unit is produced, the controller may control conduction between the second input end of the data selection switch and the output end of the data selection switch, so that the capacitance detection circuit outputs the third pulse signal to the first pixel line, to obtain the value of the capacitance load on the first pixel line. After the value of the capacitance load on the first pixel line is obtained, the controller controls conduction between the first end of the data selection switch and the output end of the data selection switch, so that the drive current circuit can provide the drive current for the first pixel line.

In some possible implementations, the resistance detection circuit is configured to obtain the second feedback signal based on the difference between the second voltage and the first voltage.

In embodiments of this disclosure, the controller controls the resistance detection circuit to output the first voltage to the first end of the metal wire, input the second voltage output by the second end of the metal wire, and output the second feedback signal to the controller, where the second feedback signal indicates the resistance load on the metal wire. After the second voltage is obtained through the resistance detection circuit, the voltage difference between the second voltage and the first voltage may be used as the second feedback signal and output to the controller, or a voltage corresponding to the voltage difference between the second voltage and the first voltage may be used as the second feedback signal and output to the controller, or the second voltage may be used as the second feedback signal and output to the controller, or a voltage corresponding to a voltage value of the second voltage may be used as the second feedback signal and output to the controller, or a digital signal corresponding to the voltage difference between the second voltage and the first voltage may be used as the second feedback signal and output to the controller. The controller obtains the value of the resistance load on the metal wire based on the received second feedback signal, and obtains the value of the resistance load on the first pixel line based on the value of the resistance load on the metal wire.

In some possible implementations, the capacitance detection circuit is configured to obtain the third feedback signal based on the maximum value of the third voltage.

In embodiments of this disclosure, the controller is configured to control the capacitance detection circuit to output the third pulse signal to the first end of the first pixel line, obtain the third voltage at the second end of the first pixel line, and output the third feedback signal to the controller, where the third feedback signal indicates the capacitance load on the first pixel line, obtain the resistance load on the first pixel line based on the second feedback signal and the proportional relationship between the width of the metal wire and the width of the first pixel line, and obtain the capacitance load on the first pixel line based on the third feedback signal. After the capacitance detection circuit obtains the third voltage, the third voltage may be used as the third feedback signal and output to the controller, or a voltage corresponding to a voltage value of the third voltage may be used as the third feedback signal and output to the controller, or a digital signal corresponding to a voltage value of the third voltage may be used as the third feedback signal and output to the controller. The controller obtains the value of the capacitance load on the first pixel line based on the received value of the third feedback voltage.

According to a second aspect, an embodiment of this disclosure provides a processing method. A load value of a first pixel line of a display unit is detected through a processing circuit, the processing circuit includes a detection circuit, a drive current circuit, and a load unit, the detection circuit is coupled to the load unit, the detection circuit is configured to detect a load value of the load unit, and there is a proportional relationship between the load value of the load unit and the load value of the first pixel line. The method includes obtaining the load value of the first pixel line based on the proportional relationship between the load value of the load unit and the load value of the first pixel line.

In some possible implementations, the processing circuit further includes the drive current circuit, the drive current circuit is coupled to the first pixel line of the display unit, and the drive current circuit is configured to provide a drive current to the first pixel line. The method further includes controlling, based on the load value of the first pixel line, a current value of the drive current provided by the drive current circuit to the first pixel line.

In some possible implementations, the load unit is a second pixel line, and there is a proportional relationship between a width of the second pixel line and a width of the first pixel line. The method further includes controlling the detection circuit to output a first pulse signal to a first end of the second pixel line, input a second pulse signal output by a second end of the second pixel line, and output a first feedback signal based on the second pulse signal, where the first feedback signal indicates a product of a resistance load and a capacitance load on the second pixel line, and obtaining the load value of the second pixel line based on the first feedback signal and the proportional relationship between the width of the second pixel line and the width of the first pixel line.

In some possible implementations, the method further includes controlling the detection circuit to obtain the first feedback signal based on high level duration of the second pulse signal.

In some possible implementations, the load unit is a metal wire, and there is a proportional relationship between a width of the metal wire and a width of the first pixel line. The detection circuit includes a resistance detection circuit and a capacitance detection circuit, the resistance detection circuit is coupled to the metal wire, and the capacitance detection circuit is coupled to the first pixel line. The method further includes controlling the resistance detection circuit to output a first voltage to a first end of the metal wire, input a second voltage output by a second end of the metal wire, and output a second feedback signal to the controller, where the second feedback signal indicates a resistance load on the metal wire, controlling the capacitance detection circuit to output a third pulse signal to a first end of the first pixel line, obtain a third voltage at a second end of the first pixel line, and output a third feedback signal to the controller, where the third feedback signal indicates a capacitance load on the first pixel line, obtaining a resistance load on the first pixel line based on the second feedback signal and the proportional relationship between the width of the metal wire and the width of the first pixel line, and obtaining the capacitance load on the first pixel line based on the third feedback signal.

In some possible implementations, the processing circuit further includes a data selection switch, the drive current circuit is coupled to a first input end of the data selection switch, the capacitance detection circuit is coupled to a second input end of the data selection switch, and an output end of the data selection switch is coupled to the first end of the first pixel line. The method further includes controlling conduction between the first input end of the data selection switch and the output end of the data selection switch, or controlling conduction between the second input end of the data selection switch and the output end of the data selection switch.

In some possible implementations, the method further includes controlling the resistance detection circuit to obtain the second feedback signal based on a difference between the second voltage and the third voltage.

In some possible implementations, the method further includes controlling the capacitance detection circuit to obtain the third feedback signal based on a maximum value of the third voltage.

According to a third aspect, an embodiment of this disclosure further provides a display apparatus. The display apparatus includes a display unit and the processing circuit described in the first aspect. The display unit includes a first pixel line configured to display an image. The processing circuit is coupled to the first pixel line, and is configured to provide a drive current for the first pixel line.

According to a fourth aspect, an embodiment of this disclosure further provides an electronic device. The electronic device includes the display apparatus described in the third aspect, and the display apparatus is configured to display an image.

According to a fifth aspect, an embodiment of this disclosure further provides a computer-readable storage medium. The computer-readable storage medium includes instructions. When the instructions are run on the display apparatus described in the third aspect or the electronic device described in the fourth aspect, the display apparatus or the electronic device is enabled to perform the method described in the second aspect.

For technical effects of the second aspect, the third aspect, the fourth aspect, and the fifth aspect, refer to the related descriptions of the first aspect. Therefore, details are not described again.

DESCRIPTION OF EMBODIMENTS

It should be noted that in embodiments of this disclosure, words such as "first" and "second" are merely used to distinguish between features of a same type, and cannot be understood as an indication of relative importance, a quantity, a sequence, or the like.

In embodiments of this disclosure, the term like "example" or "for example" is used to represent giving an example, an illustration, or a description. Any embodiment or design scheme described as an "example" or "for example" in this disclosure should not be explained as being more preferred or having more advantages than another embodiment or design scheme. To be precise, use of the word such as "example" or "for example" is intended to present a relative concept in a specific manner.

The terms "coupling" and "connection" in embodiments of this disclosure should be understood in a broad sense. For example, the term may refer to a physical direct connection, or may refer to an indirect connection implemented through an electronic component, for example, a connection implemented through a resistor, an inductor, a capacitor, or another electronic component.

First, some basic concepts in embodiments of this disclosure are explained and described.

Figure 1:
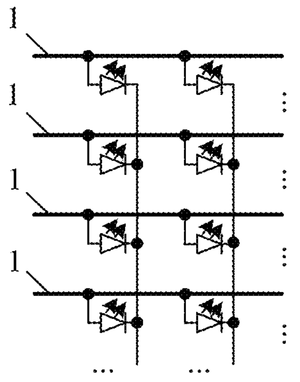
FIG. 1 is a diagram of a structure of a pixel array according to an embodiment of this disclosure.

An LED display is a display screen that displays text, graphics, an image, and animation by controlling semiconductor LEDs. As shown in FIG. 1, a pixel array includes a plurality of rows of pixel lines 1, and a plurality of LEDs are coupled to each pixel line 1. LEDs on the plurality of rows of pixel lines 1 jointly form the pixel array, and each LED is a pixel on the pixel array. Drive currents are provided for different LEDs, so that the LEDs that emit light form different patterns and display the patterns. Time required for the LED to emit light normally by providing the drive current to the LED is drive time, and the drive time is affected by a load value. Because the pixel line 1 is made of metal, the pixel line 1 also has an equivalent resistance load and a parasitic capacitance load, and the LED on the pixel line 1 also has a resistance load and a capacitance load. In this case, drive time of an LED on a pixel line 1 is affected by a resistance load and a capacitance load on the pixel line 1, and a resistance load and a capacitance load on the LED.

Due to a deviation caused by a semiconductor manufacturing process, even when displays of a same specification model are manufactured, a deviation may also exist between specifications of pixel lines 1 of two different displays of the same specification model. For example, a display is manufactured by using 8 micrometers as a standard line width.

However, in an actual etching process, for two displays of a same model, a width of a pixel line 1 of one display may be 8.5 micrometers, a width of a pixel line 1 of the other display may be 7.5 micrometers, and a difference between the widths of the pixel lines 1 of the two displays is 1 micrometer. If lengths of the pixel lines 1 are both 10 centimeters, a difference between resistance loads and a difference between capacitance loads of the pixel lines 1 of the two displays are both large. Drive time of an LED on a pixel line 1 with a larger resistance load and a larger capacitance load is obviously longer than drive time of an LED on a pixel line 1 with a smaller resistance load and a smaller capacitance load. Displays of different specifications have fixed display refresh rates, resolution, and the like. Both the fixed display refresh rate and the resolution correspond to specified drive time. If a resistance load and a capacitance load on a pixel line 1 are excessively large, drive time of a corresponding LED may exceed specified drive time. Consequently, a display function of a display is abnormal.

To resolve the foregoing problem that the drive time of the LED exceeds the specified drive time because the resistance load and the capacitor load on a data transmission line are excessively large, generally, for displays of a same specification model, a provided drive current is set to a maximum value, and the maximum drive current may satisfy that: within an allowable production error range, an LED on a data transmission line with a maximum resistance load and a maximum capacitance load emits light within specified drive time. However, in this manner, drive currents of all the displays are set to be large. Consequently, power consumption of all the displays of the same specification model increases. However, how to reduce power consumption of a display, as a device that works for a long time on an electronic device, is always an important concern in the industry. In addition, an excessively large drive current also causes a greater heat problem of the display. Consequently, a service life of the display is reduced.

Figure 2:
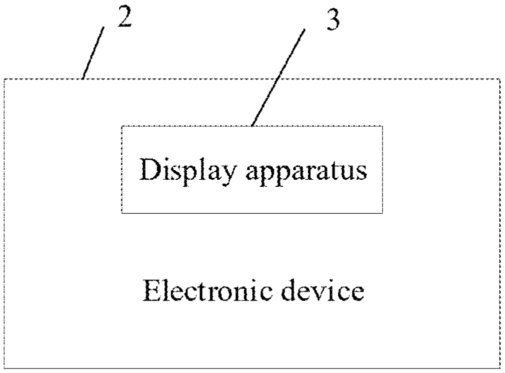
FIG. 2 is a diagram of a structure of an electronic device according to an embodiment of this disclosure.
Figure 3:
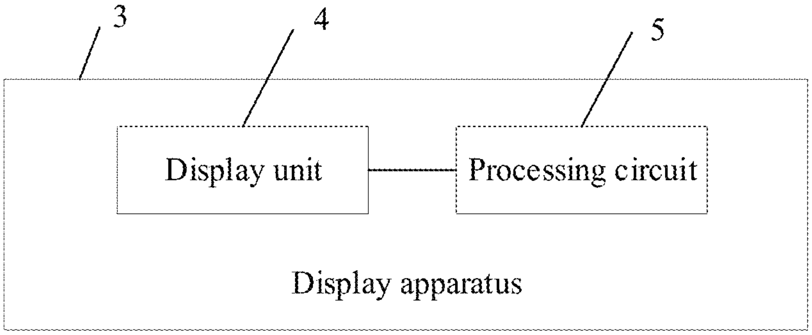
FIG. 3 is a diagram of a structure of a display apparatus according to an embodiment of this disclosure.
Figure 4:
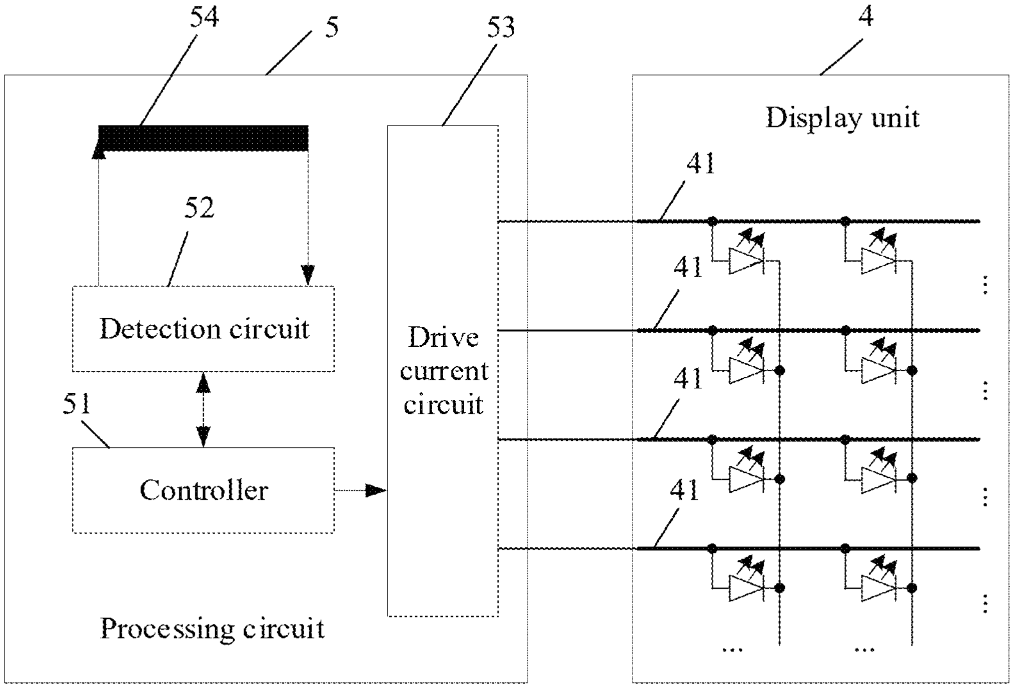
FIG. 4 is a schematic of a structure of a processing circuit according to an embodiment of this disclosure.

Therefore, an embodiment of this disclosure provides an electronic device. As shown in FIG. 2, an electronic device 2 includes a display apparatus 3, and the display apparatus 3 is configured to display an image. Referring now to FIGS. 3 and 4. As shown in FIG. 3, the display apparatus 3 includes a display unit 4 and a processing circuit 5. The display unit 4 includes a plurality of first pixel lines 41 (as shown in FIG. 4). The processing circuit 5 is coupled to the first pixel line 41 and is configured to provide a drive current for the first pixel line 41. As shown in FIG. 4, the processing circuit 5 includes a controller 51, a detection circuit 52, a drive current circuit 53, and a load unit 54. The controller 51 is separately coupled to the detection circuit 52 and the drive current circuit 53. The detection circuit 52 is coupled to the load unit 54, and the drive current circuit 53 is coupled to the first pixel line 41. The detection circuit 52 is configured to detect a load value of the load unit 54, and the drive current circuit 53 is configured to provide the drive current for the first pixel line 41. There is a proportional relationship between the load value of the load unit 54 and a load value of the first pixel line. The controller 51 is configured to obtain the load value of the first pixel line 41 based on the proportional relationship between the load value of the load unit 54 and the load value of the first pixel line 41, and control, based on the load value of the first pixel line 41, a current value of the drive current provided by the drive current circuit 53 for the first pixel line 41.

For example, when the first pixel line 41 of the display unit 4 is manufactured, the load unit 54 may be also generated by using a same process as the first pixel line 41.

For example, one processing circuit 5 may include a plurality of drive current circuits 53, and each drive current circuit 53 is configured to provide a drive current for at least one first pixel line 41.

For example, the display apparatus 3 may be a computer display, a mobile phone display, a band display, a television display, an airborne display, an advertising screen, or the like.

For example, the electronic device 2 may be a computer, a mobile phone, a watch, a tablet computer, an advertising machine, a surveillance instrument, a test instrument, a test bench, or the like.

In embodiments of this disclosure, the load unit 54 is disposed, and there is the proportional relationship between the load value of the load unit 54 and the load value of the first pixel line 41. The load value of the first pixel line 41 may be obtained by detecting the load value of the load unit 54, and then the drive current corresponding to the current value is provided for the first pixel line 41 based on the obtained load value of the first pixel line 41. The drive current corresponding to the current value is a current as small as possible when an LED on the first pixel line 41 emits light within specified drive time. In embodiments of this disclosure, a corresponding detection circuit 52 is disposed in a processing circuit 5 of each display apparatus 3, a load value of a load unit 54 is detected through the detection circuit 52, to obtain a load value of a first pixel line 41 in a display unit 4 of the display apparatus 3, and a value of a drive current provided for the first pixel line 41 is determined based on the load value of the first pixel line 41. In this way, it can be ensured that the drive current enables an LED on the first pixel line 41 to emit light within specified drive time, and the drive current is as small as possible, to reduce power consumption of the display unit 4.

Figure 5:
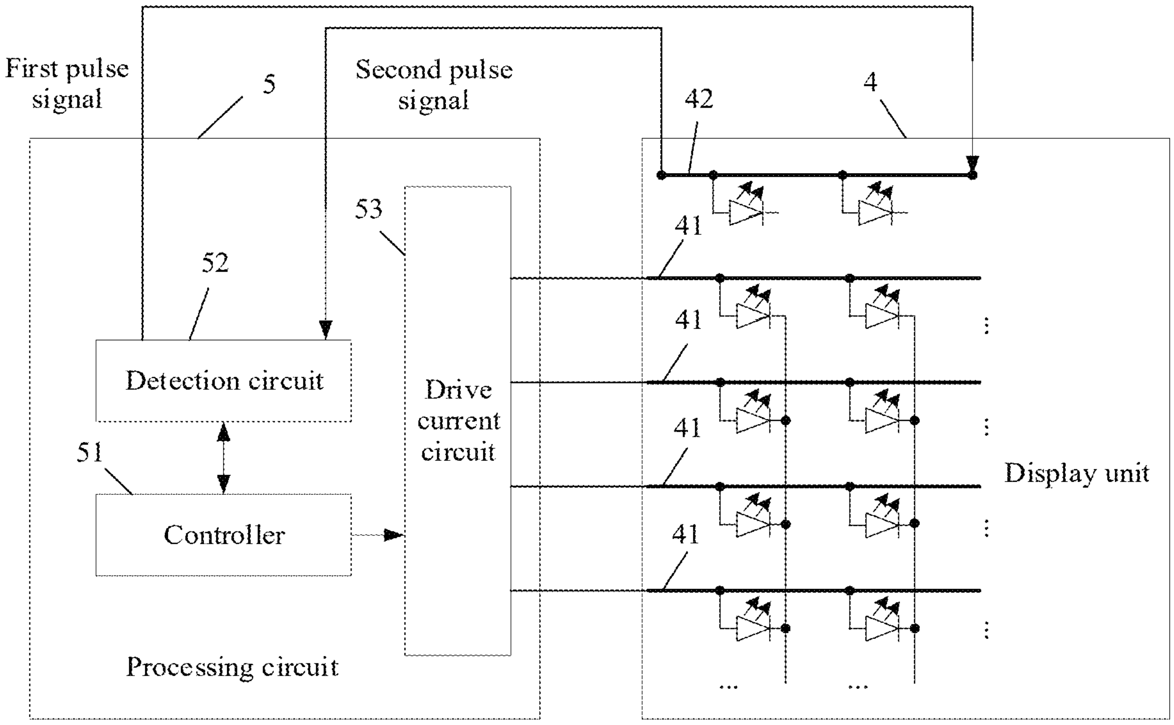
FIG. 5 is a schematic of a structure of another processing circuit according to an embodiment of this disclosure.

In some possible implementations, as shown in FIG. 5, the load unit 54 is a second pixel line 42, and there is a proportional relationship between a width of the second pixel line 42 and a width of the first pixel line 41. The controller 51 is further configured to control the detection circuit 52 to output a first pulse signal to a first end of the second pixel line 42, input a second pulse signal output by a second end of the second pixel line 42, and output a first feedback signal to the controller 51 based on the second pulse signal, where the first feedback signal indicates a product of a resistance load and a capacitance load on the second pixel line 42, and obtain the load value of the second pixel line 42 based on the first feedback signal and the proportional relationship between the width of the second pixel line 42 and the width of the first pixel line 41.

For example, the second pixel line 42 is a pixel line generated on the display unit 4 by using a same process as the first pixel line 41.

Figure 6:
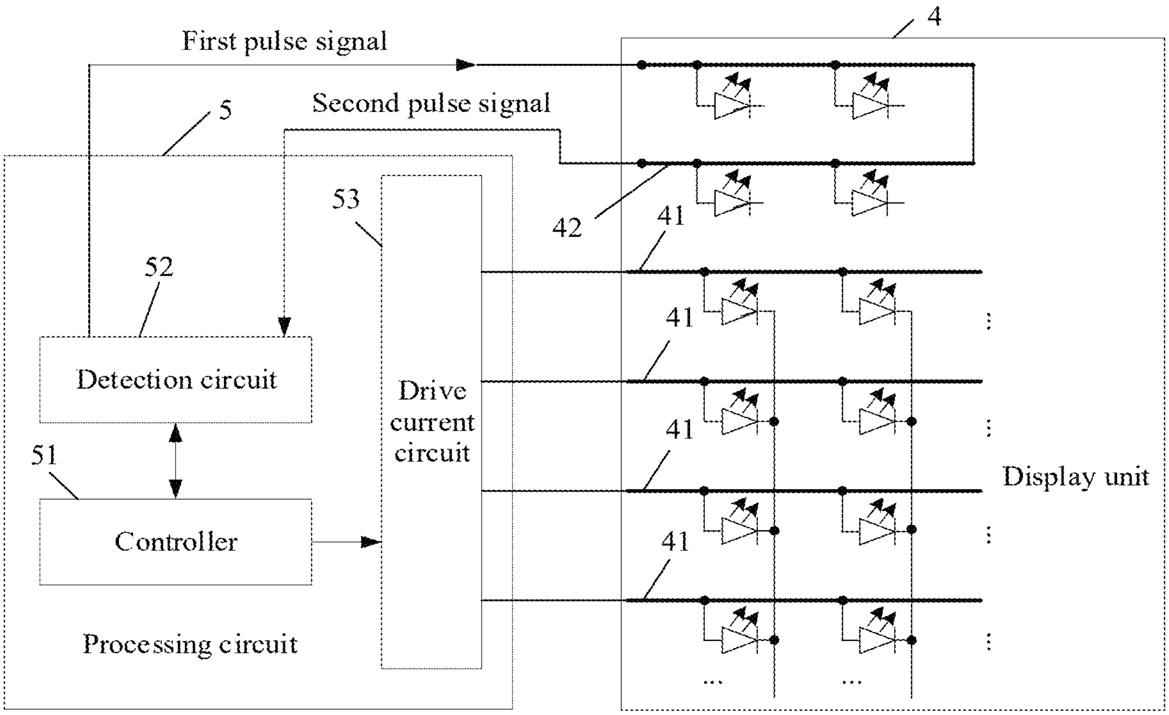
FIG. 6 is a schematic of a structure of another processing circuit according to an embodiment of this disclosure.

For example, as shown in FIG. 6, the second pixel line 42 may include two dummy pixel lines, second ends of the two dummy pixel lines are coupled, and first ends of the two dummy pixel lines are used as the first end of the second pixel line 42 and the second end of the second pixel line 42.

In some possible implementations, the detection circuit 52 is configured to obtain the first feedback signal based on high level duration of the second pulse signal.

Figure 7:
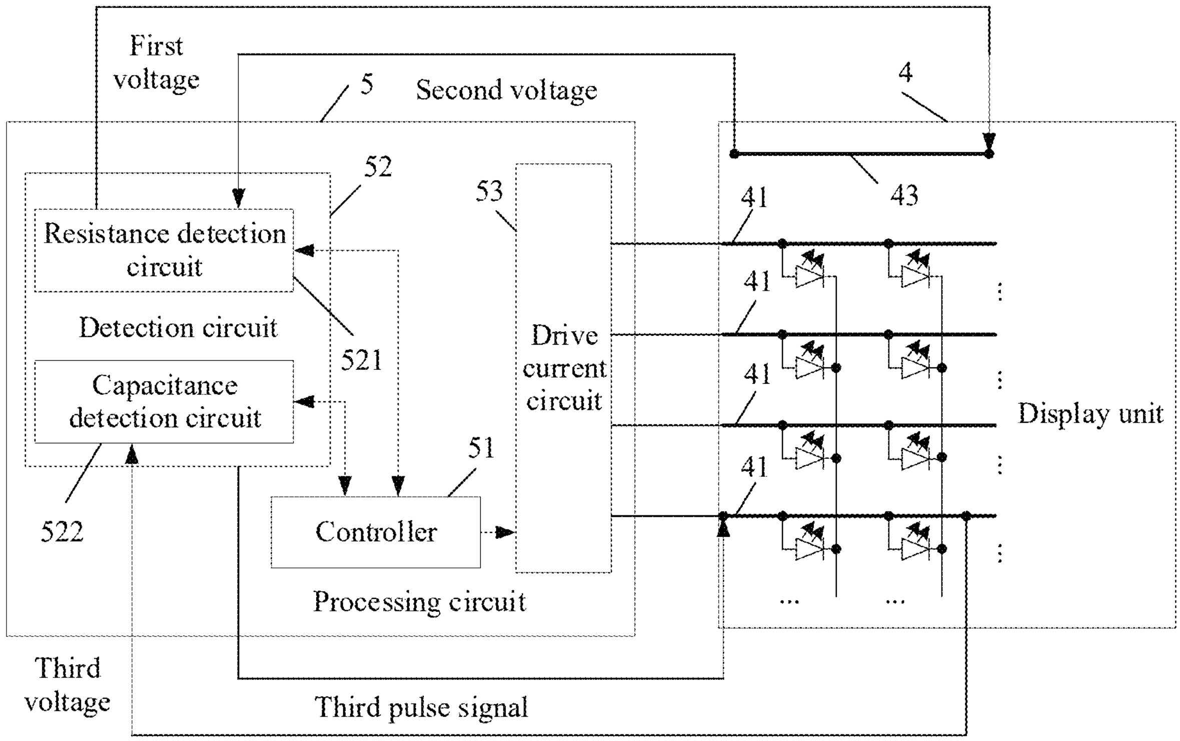
FIG. 7 is a schematic of a structure of another processing circuit according to an embodiment of this disclosure.

In some possible implementations, as shown in FIG. 7, the load unit 54 is a metal wire 43, and there is a proportional relationship between a width of the metal wire 43 and a width of the first pixel line 41. The detection circuit 52 includes a resistance detection circuit 521 and a capacitance detection circuit 522. The controller 51 is separately coupled to the resistance detection circuit 521 and the capacitance detection circuit 522. The resistance detection circuit 521 is coupled to the metal wire 43, and the capacitance detection circuit 522 is coupled to the first pixel line 41. The controller 51 is further configured to control the resistance detection circuit 521 to output a first voltage to a first end of the metal wire 43, input a second voltage output by a second end of the metal wire 43, and output a second feedback signal to the controller 51, where the second feedback signal indicates a resistance load on the metal wire 43, control the capacitance detection circuit 522 to output a third pulse signal to a first end of the first pixel line 41, obtain a third voltage at a second end of the first pixel line 41, and output a third feedback signal to the controller 51, where the third feedback signal indicates a capacitance load on the first pixel line 41, obtain a resistance load on the first pixel line 41 based on the second feedback signal and the proportional relationship between the width of the metal wire 43 and the width of the first pixel line 41, and obtain the capacitance load on the first pixel line 41 based on the third feedback signal.

Figure 8:
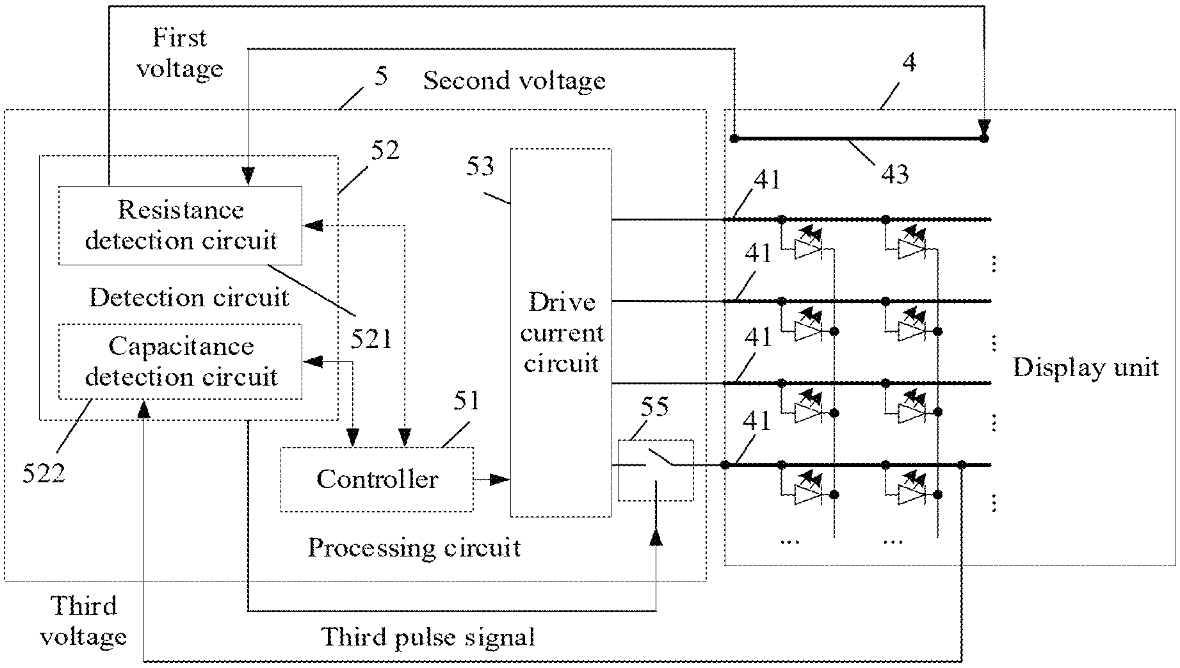
FIG. 8 is a schematic of a structure of another processing circuit according to an embodiment of this disclosure.

In some possible implementations, as shown in FIG. 8, the processing circuit 5 further includes a data selection switch 55, the drive current circuit 53 is coupled to a first input end of the data selection switch 55, the capacitance detection circuit 522 is coupled to a second input end of the data selection switch 55, and an output end of the data selection switch 55 is coupled to the first end of the first pixel line 41. The controller 51 is further configured to control conduction between the first input end of the data selection switch 55 and the output end of the data selection switch 55, or control conduction between the second input end of the data selection switch 55 and the output end of the data selection switch 55.

In some possible implementations, the resistance detection circuit 521 is configured to obtain the second feedback signal based on a difference between the second voltage and the third voltage.

In some possible implementations, the capacitance detection circuit 522 is configured to obtain the third feedback signal based on a maximum value of the third voltage.

Figure 9:
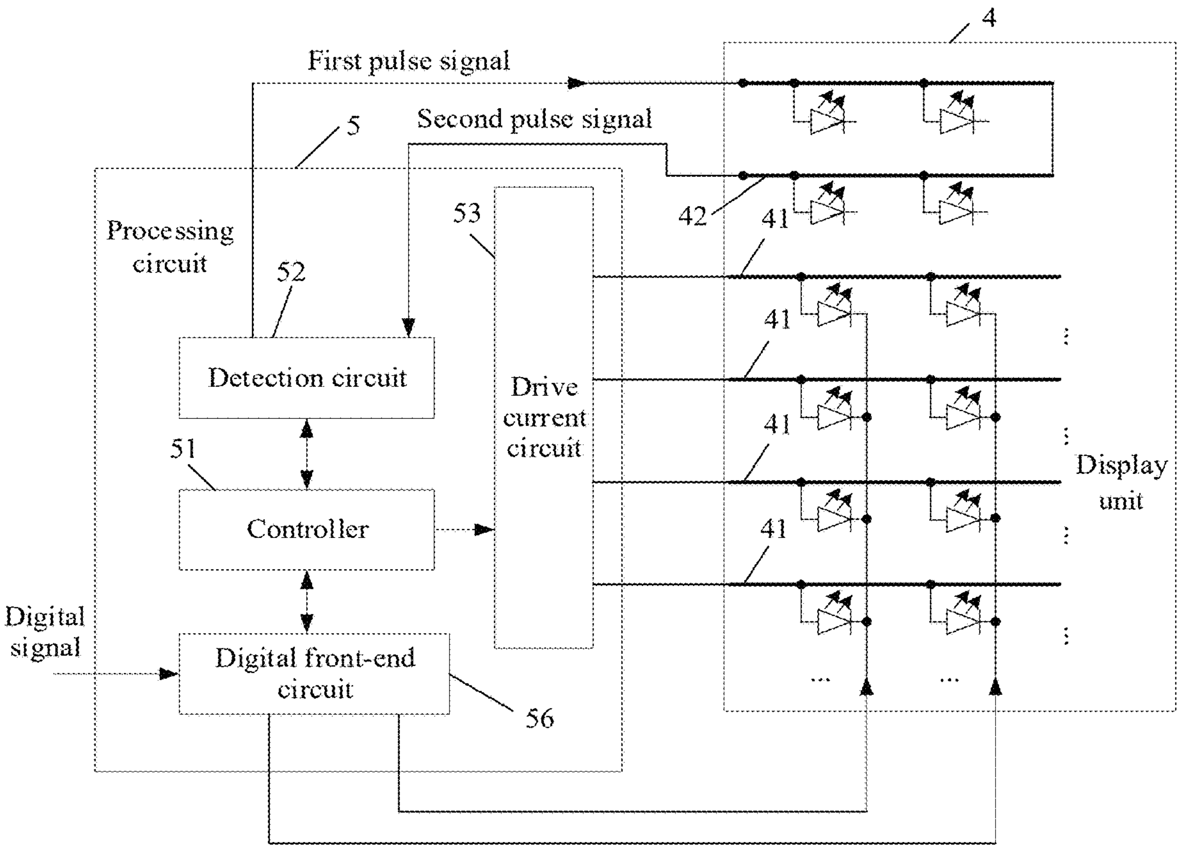
FIG. 9 is a schematic of a structure of another processing circuit according to an embodiment of this disclosure.
Figure 10:
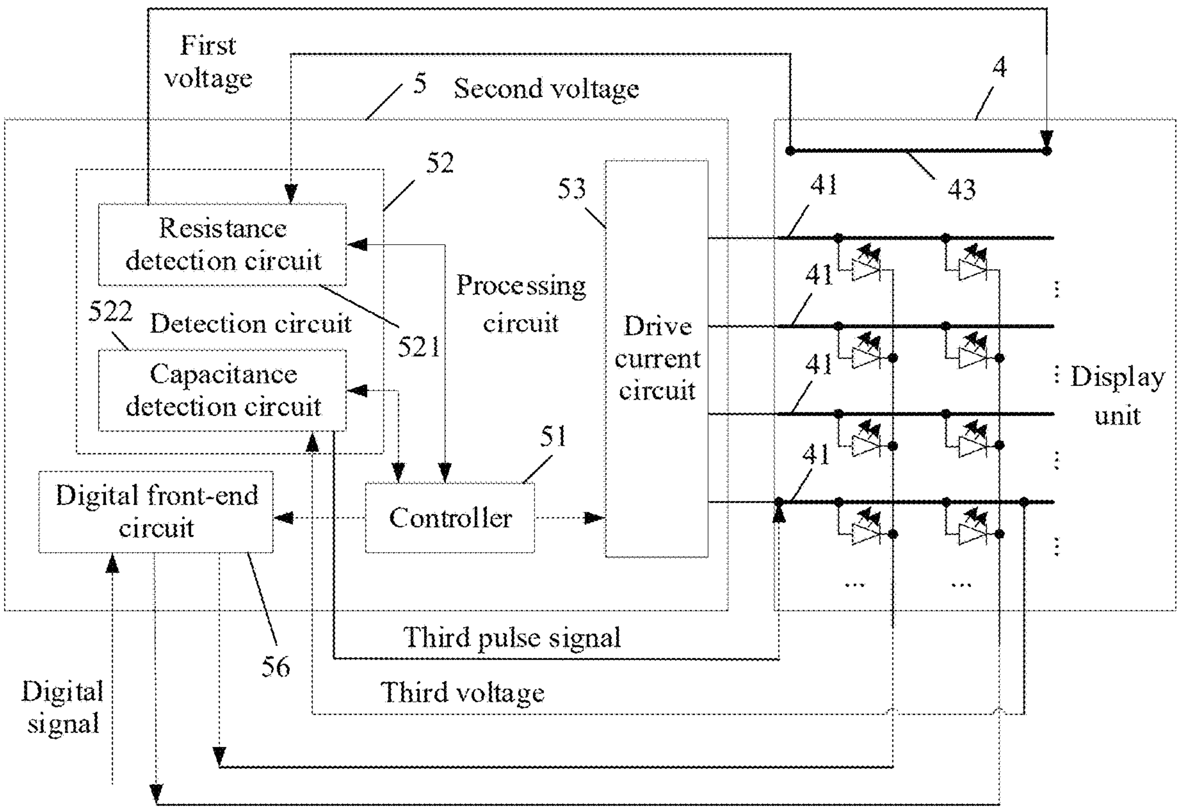
FIG. 10 is a schematic of a structure of another processing circuit according to an embodiment of this disclosure.

In some possible implementations, as shown in FIG. 9 and FIG. 10, the processing circuit 5 further includes a digital front-end circuit 56. A controlled end of the digital front-end circuit 56 is coupled to the controller 51, and an output control end of the digital front-end circuit 56 is coupled to the LED on the first pixel line 41. The digital front-end circuit 56 is configured to input a digital control signal, and control, based on the digital control signal, a corresponding LED to emit light.

Figure 11:
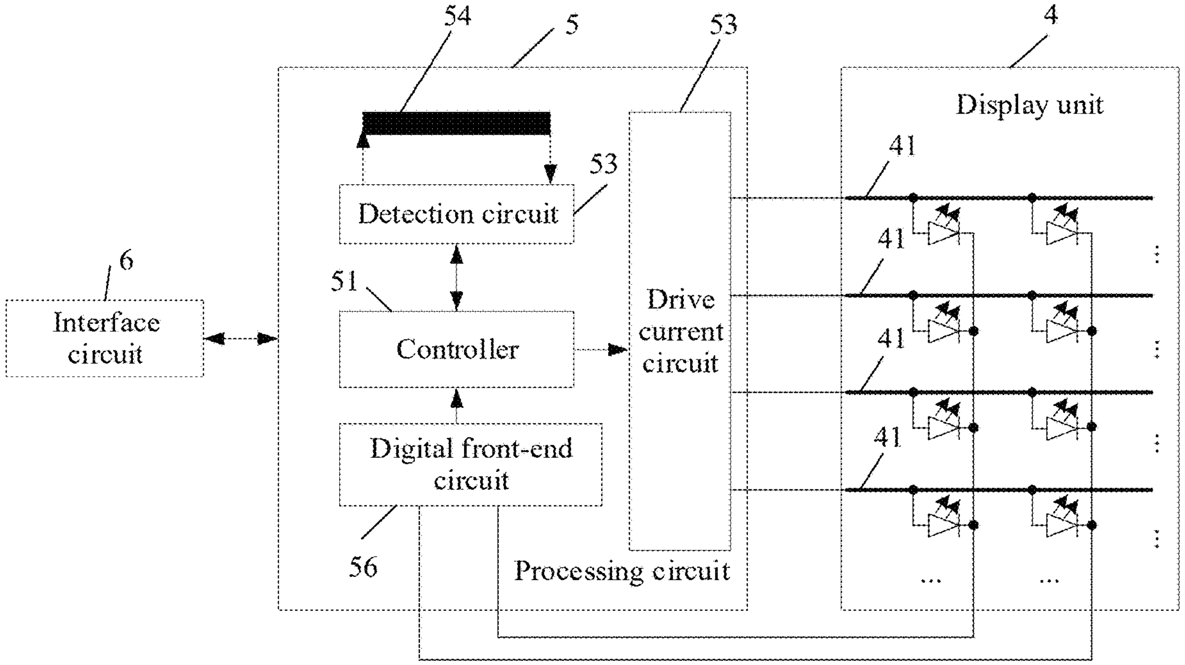
FIG. 11 is a schematic of a structure of another processing circuit according to an embodiment of this disclosure.

In some possible implementations, as shown in FIG. 11, the display apparatus 3 further includes an interface circuit 6, and the processing circuit 5 is coupled to the interface circuit 6.

For example, the processing circuit 5 may be coupled to another component inside the display apparatus 3 through the interface circuit 6, or may be coupled to another component outside the display apparatus 3 through the interface circuit 6.

Figure 12:
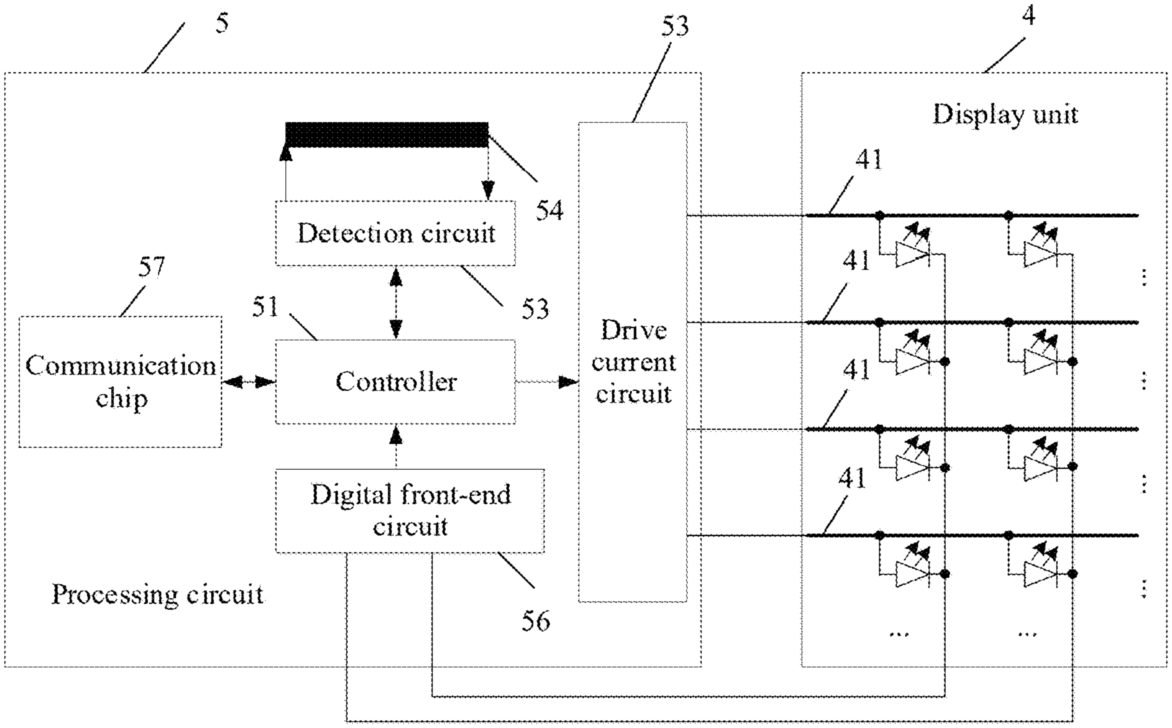
FIG. 12 is a schematic of a structure of another processing circuit according to an embodiment of this disclosure.

In some possible implementations, as shown in FIG. 12, the processing circuit 5 further includes a communication chip 57, and the controller 51 is coupled to the communication chip 57.

Figure 13:
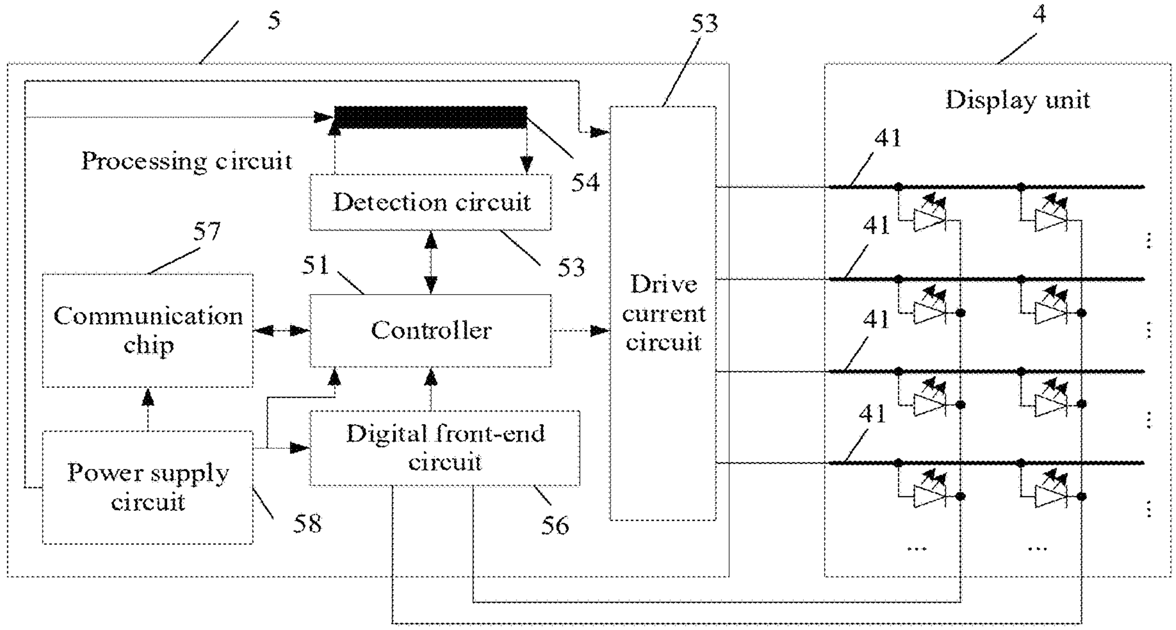
FIG. 13 is a schematic of a structure of another processing circuit according to an embodiment of this disclosure.

In some possible implementations, as shown in FIG. 13, the processing circuit 5 further includes a power supply circuit 58. The power supply circuit 58 is configured to receive a power supply current, and supply power to at least one of the controller 51, the detection circuit 52, the drive current circuit 53, the digital front-end circuit 56, and the communication chip 57.

Figure 14:
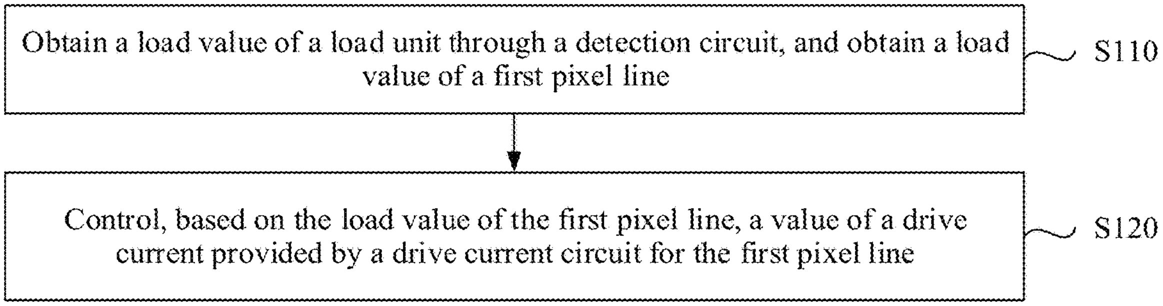
FIG. 14 is a schematic flowchart of a processing method according to an embodiment of this disclosure.

The processing circuit 5 shown in FIG. 4, FIG. 5, FIG. 6, FIG. 7, FIG. 8, FIG. 9, FIG. 10, FIG. 11, FIG. 12, and FIG. 13 may be configured to implement a processing method including step S110 and step S120 shown in FIG. 14.

Step S110: Obtain a load value of a load unit through a detection circuit, and obtain a load value of a first pixel line.

In embodiments of this disclosure, because the first pixel line 41 needs to emit light, it is difficult to connect the detection circuit to the first pixel line 41 to form a closed loop, so as to directly detect the load value of the first pixel line 41. This greatly increases complexity of a system, affects display performance of a display unit 4, and the like. Therefore, the load unit 54 needs to be generated, and there is a proportional relationship between the load value of the load unit 54 and the load value of the first pixel line 41. Then, a closed circuit loop is formed on the load unit 54 through the detection circuit 52, to obtain the load value of the load unit 54. Then, in a subsequent step, the load value of the first pixel line 41 is obtained based on the proportional relationship between the load value of the load unit 54 and the load value of the first pixel line 41.

In some possible implementations, when the display unit 4 is manufactured by using a semiconductor process, the load unit 54 is manufactured on the display unit 4 as a whole with the first pixel line 41 by using a same process.

In an existing method, the load unit 54 whose load value is proportional to the load value of the first pixel line 41 may be obtained in many manners. However, to ensure accuracy of the proportional relationship between the load value of the load unit 54 and the load value of the first pixel line 41, a very complex or strict check is usually required. However, in embodiments of this disclosure, when the display unit 4 is manufactured by using the semiconductor process, although an error exists between manufacturing of different display units 4, for a same display unit 4, first pixel lines 41 on the same display unit 4 use a same device and material, and are obtained through etching by using a same mold in a same environment. Therefore, errors of the first pixel lines 41 on the same display unit 4 are almost consistent. When the first pixel line 41 is generated, the load unit 54 is also generated. In this case, a process error of the load unit 54 is consistent with a process error of the first pixel line 41. According to this embodiment of this disclosure, the load unit 54 whose load value is proportional to the load value of the first pixel line 41 can be obtained in a convenient manner.

In some possible implementations, as shown in FIG. 5, the load unit 54 is a second pixel line 42, and there is a proportional relationship between a width of the second pixel line 42 and a width of the first pixel line 41. A controller 51 is further configured to control the detection circuit 52 to output a first pulse signal to a first end of the second pixel line 42, input a second pulse signal output by a second end of the second pixel line 42, and output a first feedback signal to the controller 51 based on the second pulse signal, where the first feedback signal indicates a product of a resistance load and a capacitance load on the second pixel line 42, and obtain the load value of the second pixel line 42 based on the first feedback signal and the proportional relationship between the width of the second pixel line 42 and the width of the first pixel line 41.

Figure 15:
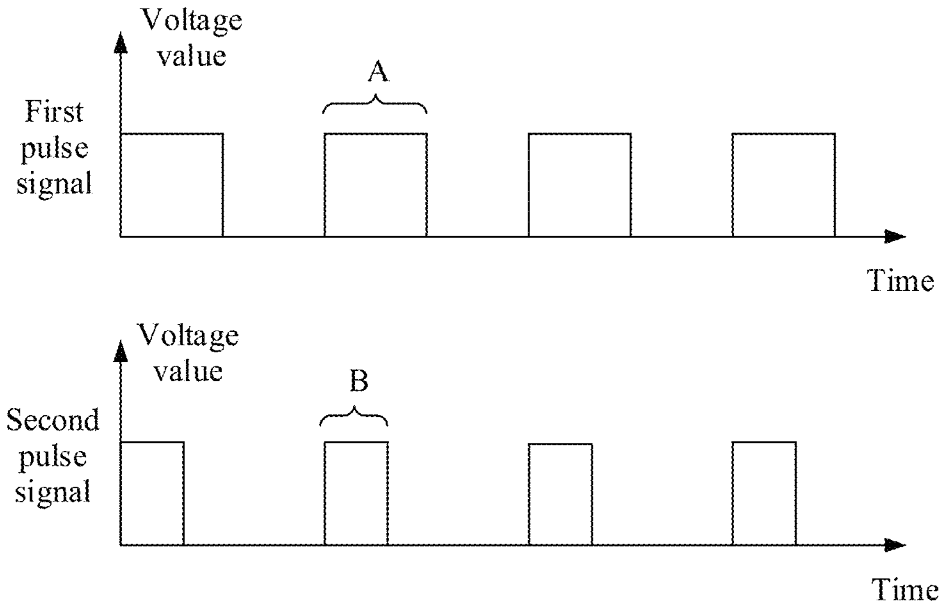
FIG. 15 is an example diagram of a first pulse signal and a second pulse signal according to an embodiment of this disclosure.

In embodiments of this disclosure, the load unit 54 may be a second pixel line 42. When the first pixel line 41 is manufactured, the second pixel line 42 is also manufactured on the display unit 4. The first pixel line 41 is used for display, and the second pixel line 42 does not participate in display work. A closed loop is formed on the second pixel line 42 through the detection circuit 52. The controller 51 outputs a first control signal to the detection circuit 52, where the first control signal indicates the detection circuit 52 to detect the load value of the second pixel line 42. After the first control signal is input, the detection circuit 52 starts to perform detection, which includes outputting the first pulse signal to the first end of the second pixel line 42. As shown in FIG. 15, the first pulse signal is a pulse signal whose effective pulse width is fixed to A. After the first pulse signal is input to the first end of the second pixel line 42, because an LED on the second pixel line 42 does not participate in working, the resistance load and the capacitance load on the second pixel line consume the first pulse signal, to obtain the second pulse signal output from the second end of the second pixel line 42. As shown in FIG. 15, the second pulse signal is a pulse signal obtained after the first pulse signal is consumed by a load on the second pixel line 42, an effective pulse width of the second pulse signal is B, and the effective pulse width B is shorter than the effective pulse width A. After inputting the second pulse signal output by the second end of the second pixel line 42, the detection circuit 52 may accumulate high levels of the second pulse signal based on the effective pulse width of the second pulse signal to obtain an accumulated voltage. A value of the accumulated voltage indicates an added value of all effective pulse widths (that is, high level duration) in the second effective pulse signal. The effective pulse width of the first pulse signal is fixed and known. A time constant of a resistive-capacitive (RC) load on the second pixel line 42 may be obtained through calculation based on the effective pulse width of the first pulse signal and the effective pulse width of the second pulse signal, that is, the product of the resistance load and the capacitance load on the second pixel line 42. A value of a resistive-capacitive load on the first pixel line 41 is obtained based on a value of the resistive-capacitive load on the second pixel line 42.

For example, the width of the second pixel line 42 may be equal to the width of the first pixel line 41.

For example, when the first pixel line 41 is manufactured by using the semiconductor process, a dummy pixel line is usually manufactured on the display unit 4. The dummy pixel line and the first pixel line 41 are manufactured based on a same specification, but the dummy pixel line does not participate in actual light emitting. Therefore, for the display unit 4 having the dummy pixel line, in actual application, the dummy pixel line is usually disposed at an edge position on the display unit 4, and may be used to assist in testing, or may be used to make the first pixel line 41 not located at an edge of the display unit 4 when the first pixel line 41 is manufactured by using the semiconductor process, or the like. In embodiments of this disclosure, the dummy pixel line may be directly used as the second pixel line 42 for detection, and no new pixel line needs to be additionally manufactured as the second pixel line 42.

For example, two adjacent dummy pixel lines may be used, second ends of the two dummy pixel lines are short-circuited together through a short-circuit cable, and first ends of the two dummy pixel lines are used as the first end and the second end of the second pixel line 42 and are configured to be coupled to the detection circuit 52. In this case, the width of the second pixel line 42 is consistent with that of the first pixel line 41, and a length of the second pixel line 42 is twice a length of the first pixel line 41.

For example, after the detection circuit 52 inputs the second pulse signal, the accumulated voltage is obtained based on the second pulse signal. The accumulated voltage may be fed back to the controller 51 as the first feedback signal. Alternatively, a voltage of a corresponding value may be output based on the accumulated voltage, and may be fed back to the controller 51 as the first feedback signal. Alternatively, a digital signal of a corresponding value may be output based on the accumulated voltage, and may be fed back to the controller 51 as the first feedback signal.

In embodiments of this disclosure, when the first feedback signal is a voltage signal, the effective pulse width of the second pulse signal is indicated based on a voltage value of the voltage signal. When the first feedback signal is a digital signal, the effective pulse width of the second pulse signal is indicated based on a value of the digital signal.

In some possible implementations, as shown in FIG. 7, the load unit 54 is a metal wire 43, and there is a proportional relationship between a width of the metal wire 43 and a width of the first pixel line 41. The detection circuit 52 includes a resistance detection circuit 521 and a capacitance detection circuit 522. A controller 51 is separately coupled to the resistance detection circuit 521 and the capacitance detection circuit 522. The resistance detection circuit 521 is coupled to the metal wire 43, and the capacitance detection circuit 522 is coupled to the first pixel line 41. The controller 51 is further configured to control the resistance detection circuit 521 to output a first voltage to a first end of the metal wire 43, input a second voltage output by a second end of the metal wire 43, and output a second feedback signal to the controller 51, where the second feedback signal indicates a resistance load on the metal wire 43, control the capacitance detection circuit 522 to output a third pulse signal to a first end of the first pixel line 41, obtain a third voltage at a second end of the first pixel line 41, and output a third feedback signal to the controller 51, where the third feedback signal indicates a capacitance load on the first pixel line 41, obtain a resistance load on the first pixel line 41 based on the second feedback signal and the proportional relationship between the width of the metal wire 43 and the width of the first pixel line 41, and obtain the capacitance load on the first pixel line 41 based on the third feedback signal.

In embodiments of this disclosure, the load unit 54 may be a metal wire 43 that is not coupled to an LED, and there is the proportional relationship between the width of the metal wire 43 and the width of the first pixel line 41. The controller 51 sends a second control signal to the resistance detection circuit 521, where the second control signal indicates the resistance detection circuit 521 to detect the resistance load on the metal wire 43. A specific detection manner is as follows. The resistance detection circuit 521 outputs the first voltage with a fixed voltage value to the first end of the metal wire 43, and inputs, from the second end of the metal wire 43, the second voltage output by the metal wire 43, where the second voltage is a voltage obtained after the first voltage input to the metal wire 43 is consumed by the resistance load on the metal wire 43. A value of the resistance load on the metal wire 43 may be obtained based on a voltage difference between the second voltage and the first voltage, and a value of the resistance load on the first pixel line 41 may be obtained based on the value of the resistance load on the metal wire 43. The controller 51 further sends a third control signal to the capacitance detection circuit 522, where the third control signal indicates the capacitance detection circuit 522 to send the third pulse signal to the first end of the first pixel line 41, and the capacitance detection circuit 522 obtains a voltage value (that is, a value of the third voltage) at the second end of the first pixel line 41. In this process, the LED on the first pixel line 41 does not work. Therefore, the third pulse signal charges a parasitic capacitance of the first pixel line 41. The voltage value at the second end of the first pixel line 41 increases with charging of the parasitic capacitance. After the parasitic capacitance is charged to a maximum value, the voltage value at the second end of the first pixel line 41 reaches the maximum value and is fixed, that is, the third voltage reaches the maximum value. In this case, the maximum value of the third voltage may indicate a value of the capacitance load on the first pixel line 41.

For example, after the second voltage is obtained through the resistance detection circuit 521, the voltage difference between the second voltage and the first voltage may be used as the second feedback signal and output to the controller 51, or a voltage corresponding to the voltage difference between the second voltage and the first voltage may be used as the second feedback signal and output to the controller 51, or the second voltage may be used as the second feedback signal and output to the controller 51, or a voltage corresponding to a voltage value of the second voltage may be used as the second feedback signal and output to the controller 51, or a digital signal corresponding to the voltage difference between the second voltage and the first voltage may be used as the second feedback signal and output to the controller 51. The controller 51 obtains the value of the resistance load on the metal wire 43 based on the received second feedback signal, and obtains the value of the resistance load on the first pixel line 41 based on the value of the resistance load on the metal wire 43.

For example, the width of the metal wire 43 may be equal to the width of the first pixel line 41.

In embodiments of this disclosure, when the width of the metal wire 43 is equal to the width of the first pixel line 41, a proportional relationship between the value of the resistance load on the metal wire 43 and the value of the resistance load on the first pixel line 41 is equal to a length proportional relationship. Because both a length of the metal wire 43 and the length of the first pixel line 41 are long, a length error between the metal wire 43 and the first pixel line 41 may be ignored. For example, both widths of the metal wire 43 and the first pixel line 41 are 8 micrometers, the length of the metal wire 43 is 20 cm, the length of the first pixel line 41 is 10 cm, and if there is an error of several micrometers between the metal wire 43 and the first pixel line 41, the error may also be ignored. Therefore, when the widths are set to a same value, the proportional relationship is more accurate.

For example, after the capacitance detection circuit 522 obtains the third voltage, the third voltage may be used as the third feedback signal and output to the controller 51, or a voltage corresponding to a voltage value of the third voltage may be used as the third feedback signal and output to the controller 51, or a digital signal corresponding to a voltage value of the third voltage may be used as the third feedback signal and output to the controller 51. The controller 51 obtains the value of the capacitance load on the first pixel line 41 based on the received value of the third feedback voltage.

In some possible implementations, as shown in FIG. 8, the processing circuit 5 further includes a data selection switch 55, a drive current circuit 53 is coupled to a first input end of the data selection switch 55, the capacitance detection circuit 522 is coupled to a second input end of the data selection switch 55, and an output end of the data selection switch 55 is coupled to the first end of the first pixel line 41. The controller 51 is further configured to control conduction between the first input end of the data selection switch 55 and the output end of the data selection switch 55, or control conduction between the second input end of the data selection switch 55 and the output end of the data selection switch 55.

In embodiments of this disclosure, when a display apparatus 3 is produced, the controller 51 may control conduction between the second input end of the data selection switch 55 and the output end of the data selection switch 55, so that the capacitance detection circuit 522 outputs the third pulse signal to the first pixel line 41, to obtain the value of the capacitance load on the first pixel line 41. After the value of the capacitance load on the first pixel line 41 is obtained, the controller 51 controls conduction between the first end of the data selection switch 55 and the output end of the data selection switch 55, so that the drive current circuit 53 can provide a drive current for the first pixel line 41.

Step S120: Control, based on the load value of the first pixel line, a value of the drive current provided by the drive current circuit for the first pixel line.

In some possible implementations, the drive current circuit 53 may adjust the current value of the provided drive current. The controller 51 sends a fourth control signal to the drive current circuit 53 based on the value of the resistive-capacitive load on the first pixel line 41, where the fourth control signal indicates the drive current circuit 53 to provide the drive current with the corresponding current value.

In some possible implementations, the controller 51 sends the fourth control signal to the drive current circuit 53 based on the value of the resistance load and the value of the capacitance load on the first pixel line 41, where the fourth control signal indicates the drive current circuit 53 to provide the drive current with the corresponding current value.

For example, the fourth control signal may be a digital signal, and different values of the digital signal correspond to drive currents of different values.

For example, the drive current circuit 53 may generate a plurality of currents of different values, and select one of the plurality of currents as a drive current based on an indication of the fourth control signal and provide the drive current for the first pixel line 41.

For example, the drive current circuit 53 may generate a plurality of currents, and current values of the plurality of currents may be the same or may be different. At least one of the plurality of currents is selected as a drive current based on an indication of the fourth control signal, and the drive current is provided for the first pixel line 41.

For example, after the display apparatus 3 is manufactured and delivered from the factory, because the display apparatus 3 is in a different environment, the value of the load on the first pixel line 41 may change. For example, in a high-temperature environment, resistance loads on the first pixel line 41 and the load unit 54 may change. In this case, the value of the drive current that is set before delivery may not meet normal working of the LED. In this case, the controller 51 may re-detect the value of the load on the first pixel line 41, and adjust the value of the drive current. For example, as shown in FIG. 8, the controller 51 may control conduction between the second end of the data selection switch 55 and the output end of the data selection switch 55, to control the capacitance detection circuit 522 to output the third pulse signal to the first pixel line 41, so as to obtain the capacitance load on the first pixel line 41.

In some possible implementations, as shown in FIG. 9 and FIG. 10, the processing circuit 5 further includes a digital front-end circuit 56. A controlled end of the digital front-end circuit 56 is coupled to the controller 51, and an output control end of the digital front-end circuit 56 is coupled to the LED on the first pixel line 41. The digital front-end circuit 56 is configured to input a digital control signal, and control, based on the digital control signal, a corresponding LED to emit light.

For example, the digital front-end circuit 56 may control a working state of a column of LEDs via one signal, or may control a working state of one LED via one signal.

In embodiments of this disclosure, as shown in FIG. 9 and FIG. 10, the drive current circuit 53 provides a drive current for a first pixel line 41 in a corresponding row. The controller 51 outputs a digital control signal to the digital front-end circuit 56, and controls, via the digital control signal, whether the digital front-end circuit 56 works. When the digital front-end circuit 56 works, a control signal is output to a corresponding LED based on the received digital signal, where the control signal is used to control whether the corresponding LED is conducted with the first pixel line 41 to implement light emitting. Different LEDs may form different graphs by emitting light. In addition, the digital front-end circuit 56 may be configured to control a light-emitting color, light-emitting duration, light-emitting intensity, and the like of the LED.

In some possible implementations, as shown in FIG. 11, the display apparatus 3 further includes an interface circuit 6, and the processing circuit 5 is coupled to the interface circuit 6.

For example, the processing circuit 5 may be coupled to another component inside the display apparatus 3 through the interface circuit 6, or may be coupled to another component outside the display apparatus 3 through the interface circuit 6.

For example, the controller 51 is coupled to another component inside the display apparatus 3 through the interface circuit 6, or may be coupled to another component outside the display apparatus 3 through the interface circuit 6.

For example, the digital front-end circuit 56 receives the digital signal through the interface circuit 6, and controls a light-emitting state of the corresponding LED based on the digital signal.

In some possible implementations, as shown in FIG. 12, the processing circuit 5 further includes a communication chip 57, and the controller 51 is coupled to the communication chip 57.

For example, the controller 51 may perform data exchange, wireless control, and the like with an external controller through the communication chip 57.

Embodiments of this disclosure provide a processing circuit, a processing method, a display apparatus, and an electronic device. A load unit and a detection circuit are disposed in the processing circuit. There is a proportional relationship between a load value of the load unit and a load value of a first pixel line. The load value of the load unit is obtained through the detection circuit, to obtain the load value of the first pixel line, and then a drive current circuit is controlled, based on the load value of the first pixel line, to provide a corresponding drive current for the first pixel line. When the drive current enables an LED on the first pixel line to emit light within drive time, a current value is as small as possible. According to the solutions described in embodiments of this disclosure, when the display apparatus works normally, display power consumption is reduced as much as possible, and heat is reduced by reducing the power consumption, thereby prolonging a service life of the display apparatus.

An embodiment of this disclosure further provides a computer-readable storage medium. The computer-readable storage medium includes instructions. When the instructions are run on the display apparatus or the electronic device described in the foregoing embodiment, the display apparatus or the electronic device is enabled to perform the method described in FIG. 14.

The controller in embodiments of this disclosure may be a chip. For example, the controller may be a field-programmable gate array (FPGA), an application-specific integrated chip (ASIC), a system on chip (SoC), a central processing unit (CPU), a network controller (e.g., a network processor (NP)), a digital signal processing circuit (DSP), a micro controller unit (MCU), a programmable controller (PLD), or another integrated chip.

The memory in embodiments of this disclosure may be a volatile memory or a nonvolatile memory, or may include both a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. By way of example but not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct Rambus (DR) RAM. It should be noted that the memory of the systems and methods described in this specification includes but is not limited to these and any memory of another proper type.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of embodiments of this disclosure.

A person of ordinary skill in the art may be aware that, in combination with the examples described in embodiments disclosed in this specification, modules and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this disclosure, it should be understood that the disclosed system, devices, and methods may be implemented in other manners. For example, the described device embodiment is merely an example. For example, division into the modules is merely logical function division and may be other division in an actual implementation. For example, a plurality of modules or components may be combined or integrated into another device, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate components may or may not be physically separate, and components displayed as modules may or may not be physical modules, may be located in one device, or may be distributed on a plurality of devices. Some or all of the modules may be selected based on actual needs to achieve the objectives of the solutions of embodiments.

In addition, functional modules in embodiments of this disclosure may be integrated into one device, or each of the modules may exist alone physically, or two or more modules are integrated into one device.

All or some of the foregoing embodiments may be implemented by using software, hardware, firmware, or any combination thereof. When a software program is used to implement embodiments, embodiments may be implemented fully or partially in a form of a computer program product. The computer program product includes one or more computer instructions. When the computer program instructions are loaded and executed on a computer, the procedures or functions according to embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A processing circuit comprising:
- a load unit comprising a first load value, wherein the load unit is a metal wire comprising a first end and a second end;
- a detection circuit coupled to the load unit and configured to:
  - detect the first load value;
  - obtain a first proportional relationship between the first load value and a second load value of a first pixel line of a display unit, wherein the first pixel line comprises a third end and a fourth end;
  - obtain, based on the first proportional relationship and the first load value, the second load value to control the first pixel line; and
  - obtain a second proportional relationship between a second width of the metal wire and a first width of the first pixel line,
- wherein the detection circuit comprises:
  - a resistance detection circuit coupled to the metal wire and configured to:
    - output a first voltage to the first end;
    - receive a second voltage from the second end; and
    - output a first feedback signal indicating a first resistance load on the metal wire; and
  - a capacitance detection circuit coupled to the first pixel line and configured to:
    - output a pulse signal to the third end;
    - obtain a third voltage at the fourth end; and
    - output a second feedback signal indicating a capacitance load on the first pixel line;
- a drive current circuit coupled to the first pixel line and configured to provide a drive current to the first pixel line; and
- a controller separately coupled to the drive current circuit and the detection circuit, and further coupled to the resistance detection circuit and the capacitance detection circuit, and configured to:
  - receive the first feedback signal from the resistance detection circuit;
  - obtain, based on the first feedback signal and the second proportional relationship, a second resistance load on the first pixel line;
  - receive the second feedback signal from the capacitance detection circuit;
  - obtain, based on the second feedback signal, the capacitance load on the first pixel line;
  - obtain, based on the second resistance load and the capacitance load, the second load value; and
  - adjust, based on the second load value, a current value of the drive current.

2. The processing circuit of claim 1, further comprising a data selection switch comprising:
- a first input end coupled to the drive current circuit;
- a second input end coupled to the capacitance detection circuit; and
- an output end coupled to the third end,
- wherein the controller is further configured to control first conduction between the first input end and the output end or second conduction between the second input end and the output end.

3. The processing circuit of claim 1, wherein the resistance detection circuit is further configured to:
- obtain a difference between the second voltage and the third voltage; and
- obtain, based on the difference, the first feedback signal.

4. The processing circuit of claim 1, wherein the capacitance detection circuit is further configured to obtain, based on a maximum value of the third voltage, the second feedback signal.

5. The processing circuit of claim 1, wherein the controller is further configured to adjust, based on the second load value of the first pixel line, the current value of the drive current by sending a control signal to the drive current circuit based on the second load value of the first pixel line, and wherein the control signal indicates the drive current circuit to generate one of a plurality of currents of different values to provide the drive current to the first pixel line.

6. The processing circuit of claim 1, wherein the controller is further configured to:

re-detect the first load value after the processing circuit is deployed to obtain a re-detected first load value; and adjust the current value of the drive current based on the re-detected first load value.

7. The processing circuit of claim 1, wherein the second width of the metal wire is equal to the first width of the first pixel line.

8. The processing circuit of claim 1, further comprising a digital front-end circuit, wherein a controlled end of the digital front-end circuit is coupled to the controller and an output control end of the digital front-end circuit is coupled to a light-emitting diode (LED) on the first pixel line, and wherein the digital front-end circuit is configured to receive a digital control signal and control, based on the digital control signal, the LED to emit light.

9. The processing circuit of claim 1, further comprising a communication chip coupled to the controller.

10. A processing method comprising:

detecting a first load value of a load unit, wherein the load unit is a metal wire;

obtaining a first proportional relationship between the first load value and a second load value of a first pixel line of a display unit;

obtaining, based on the first proportional relationship and the first load value, the second load value to control the first pixel line;

obtaining a second proportional relationship between a second width of the metal wire and a first width of the first pixel line;

outputting a first voltage to a first end of the metal wire;

receiving a second voltage from a second end of the metal wire;

outputting a first feedback signal indicating a first resistance load on the metal wire;

outputting a pulse signal to a third end of the first pixel line;

obtaining a third voltage at a fourth end of the first pixel line;

outputting a second feedback signal indicating a capacitance load on the first pixel line;

obtaining, based on the first feedback signal and the second proportional relationship, a second resistance load on the first pixel line;

obtaining, based on the second feedback signal, the capacitance load;

obtaining, based on the second resistance load and the capacitance load, the second load value to control the first pixel line; and adjusting, based on the second load value, a current value of a drive current of the first pixel line.

11. The processing method of claim 10, further comprising:

controlling first conduction between a first input end of a data selection switch and an output end of the data selection switch; or controlling second conduction between a second input end of the data selection switch and the output end.

12. The processing method of claim 10, further comprising:

obtaining a difference between the second voltage and the third voltage; and obtaining, based on the difference, the first feedback signal.

13. The processing method of claim 10, further comprising obtaining, based on a maximum value of the third voltage, the second feedback signal.

14. The processing method of claim 10, wherein the adjusting of the current value of the drive current comprises sending a control signal to a drive current circuit based on the second load value of the first pixel line, and wherein the control signal indicates the drive current circuit to generate one of a plurality of currents of different values to provide the drive current to the first pixel line.

15. The processing method of claim 10, further comprising:

re-detecting the first load value of a processing circuit after the processing circuit is deployed to obtain a re-detected first load value; and adjusting the current value of the drive current based on the re-detected first load value.

16. The processing method of claim 10, wherein the second width of the metal wire is equal to the first width of the first pixel line.

17. The processing method of claim 10, further comprising receiving a digital control signal and controlling, based on the digital control signal, a light-emitting diode (LED) on the first pixel line to emit light.

18. A display apparatus comprising:

a display unit comprising a first pixel line configured to display an image, wherein the first pixel line comprises a second load value, wherein the first pixel line comprises a third end and a fourth end; and a processing circuit coupled to the display unit and comprising:

a load unit comprising a first load value, wherein the load unit is a metal wire comprising a first end and a second end;

a detection circuit coupled to the load unit and configured to:

detect the first load value;

obtain a first proportional relationship between the first load value and the second load value;

obtain, based on the first proportional relationship and the first load value, the second load value to control the first pixel line; and obtain a second proportional relationship between a second width of the metal wire and a first width of the first pixel line, wherein the detection circuit comprises:

a resistance detection circuit coupled to the metal wire and configured to:

output a first voltage to the first end;

receive a second voltage from the second end; and output a first feedback signal indicating a first resistance load on the metal wire; and a capacitance detection circuit coupled to the first pixel line and configured to:

output a pulse signal to the third end;

obtain a third voltage at the fourth end; and output a second feedback signal indicating a capacitance load on the first pixel line;

a drive current circuit coupled to the first pixel line and configured to provide a drive current to the first pixel line; and a controller separately coupled to the drive current circuit and the detection circuit, and further coupled to the resistance detection circuit and the capacitance detection circuit, and configured to:

receive the first feedback signal from the resistance detection circuit;

obtain, based on the first feedback signal and the second proportional relationship, a second resistance load on the first pixel line;

receive the second feedback signal from the capacitance detection circuit;

obtain, based on the second feedback signal, the capacitance load on the first pixel line;

obtain, based on the second resistance load and the capacitance load, the second load value; and adjust, based on the second load value, a current value of the drive current.

19. The display apparatus of claim 18, wherein the controller is further configured to adjust, based on the second load value of the first pixel line, the current value of the drive current by sending a control signal to the drive current circuit based on the second load value of the first pixel line, and wherein the control signal indicates the drive current circuit to generate one of a plurality of currents of different values to provide the drive current to the first pixel line.

20. The display apparatus of claim 18, further comprising a data selection switch comprising:

a first input end coupled to the drive current circuit;

a second input end coupled to the capacitance detection circuit; and an output end coupled to the third end of the first pixel line, wherein the controller is further configured to control first conduction between the first input end and the output end or second conduction between the second input end and the output end.

* * * * *